(12) United States Patent
Lowry et al.

(10) Patent No.: US 11,009,485 B2
(45) Date of Patent: May 18, 2021

(54) METHOD OF IDENTIFYING AND REMOVING SURFACE IRREGULARITIES BEFORE ULTRASONIC INSPECTION AND DEVICE FOR IDENTIFYING SURFACE IRREGULARITIES

(71) Applicant: Framatome Inc., Lynchburg, VA (US)

(72) Inventors: Mark W. Lowry, Lynchburg, VA (US); Nghiep K. Du, Lynchburg, VA (US)

(73) Assignee: Framatome Inc., Lynchburg, VA (US)

( * ) Notice: Subject to any disclaimer, the term of this patent is extended or adjusted under 35 U.S.C. 154(b) by 152 days.

(21) Appl. No.: 16/129,734

(22) Filed: Sep. 12, 2018

(65) Prior Publication Data

US 2020/0080968 A1 Mar. 12, 2020

(51) Int. Cl.
*G01N 27/90* (2021.01)
*G01N 27/9013* (2021.01)
*G01N 27/904* (2021.01)

(52) U.S. Cl.
CPC ......... *G01N 27/902* (2013.01); *G01N 27/904* (2013.01); *G01N 27/9033* (2013.01)

(58) Field of Classification Search
None
See application file for complete search history.

(56) References Cited

U.S. PATENT DOCUMENTS

| | | | |
|---|---|---|---|
| 4,945,307 A | 7/1990 | Tornblom | |
| 5,179,425 A | 1/1993 | Reinsch et al. | |
| 5,686,720 A | 11/1997 | Tullis | |
| 8,620,033 B2 | 12/2013 | Bitzel, Jr. et al. | |
| 9,030,196 B2 | 5/2015 | Boenisch | |
| 9,255,875 B2 | 2/2016 | Denenberg et al. | |
| 2007/0100579 A1* | 5/2007 | Rempt | G01N 27/902 702/168 |
| 2007/0126422 A1* | 6/2007 | Crouch | G01N 27/904 324/240 |
| 2009/0016650 A1* | 1/2009 | Bell | H04N 5/2254 382/313 |
| 2010/0052669 A1* | 3/2010 | Kwun | G01N 29/043 324/240 |
| 2013/0124109 A1* | 5/2013 | Denenberg | G01N 17/04 702/35 |

(Continued)

FOREIGN PATENT DOCUMENTS

| | | |
|---|---|---|
| DE | 102015211025 A1 | 12/2016 |
| EP | 0289207 B1 | 6/1992 |

(Continued)

*Primary Examiner* — Nasima Monsur
(74) *Attorney, Agent, or Firm* — Davidson, Davidson & Kappel, LLC

(57) ABSTRACT

A distance sensor unit is also provided. The distance sensor unit includes an array of distance sensors configured to identify surface irregularities deviating from an expected nominal geometry of a surface as the distance sensor unit is moved along the surface and a handheld housing configured for being gripped by an operator. The array of distance sensors is connected to the handheld housing. The distance sensor unit also includes at least one surface irregularity indicator configured for providing an alert to the operator as the distance sensor unit moves over one of the surface irregularities deviating from the expected nominal geometry of the surface.

16 Claims, 8 Drawing Sheets

(56) References Cited

U.S. PATENT DOCUMENTS

2014/0026667 A1* 1/2014 O'Keefe ................ G01B 17/02
73/622

FOREIGN PATENT DOCUMENTS

| EP | 0677742 B1 | 10/2004 |
| EP | 2278324 A1 | 1/2011 |
| JP | 2001208730 A | 8/2001 |
| JP | 2005164516 A | 6/2005 |
| JP | 4681770 B2 | 5/2011 |
| WO | WO 2017/117320 A1 | 7/2017 |

* cited by examiner

METHOD OF IDENTIFYING AND REMOVING SURFACE IRREGULARITIES BEFORE ULTRASONIC INSPECTION AND DEVICE FOR IDENTIFYING SURFACE IRREGULARITIES

The present disclosure relates generally to ultrasonic inspection methods and more specifically to methods for preparing surfaces for ultrasonic inspection.

BACKGROUND

Pipes in nuclear power plants are subject to ultrasonic testing (UT) to detect flaws in the pipes. DE102014119684 discloses a UT device for inspection of curved surface.

SUMMARY OF THE INVENTION

A distance sensor unit is also provided. The distance sensor unit includes an array of distance sensors configured to identify surface irregularities deviating from an expected nominal geometry of a surface as the distance sensor unit is moved along the surface and a handheld housing configured for being gripped by an operator. The array of distance sensors being connected to the handheld housing. The distance sensor unit also includes at least one surface irregularity indicator configured for providing an alert to the operator as the distance sensor unit moves over one of the surface irregularities deviating from the expected nominal geometry of the surface.

A method for identifying surface irregularities is provided. The method includes providing an array of distance sensors configured to identify surface irregularities deviating from an expected nominal geometry of a surface as the distance sensor unit is moved along the surface. The distance sensors are connected to a handheld housing configured for being gripped by an operator. The distance sensors are coupled to at least one surface irregularity indicator. The method further includes moving the array of distance sensors along the surface such that the least one surface irregularity indicator alerts the operator when the distance sensor unit moves over one of the surface irregularities deviating from the expected nominal geometry of the surface.

A method for inspecting a surface of a part is provided. The method includes moving a distance sensor unit including an array of distance sensors along the surface to identify surface irregularities radially protruding beyond a predetermined distance threshold as the distance sensor unit is moved along the surface; removing the surface irregularities radially protruding beyond the predetermined distance threshold; and inspecting the part by moving a testing probe along the surface after the removing of the surface irregularities radially protruding beyond the predetermined distance threshold.

BRIEF DESCRIPTION OF THE DRAWINGS

The present invention is described below by reference to the following drawings, in which.

DETAILED DESCRIPTION

The present disclosure provides a method of identifying and removing surface irregularities before testing, which in one preferred embodiment is ultrasonic testing, and a device for detecting surface irregularities. When performing ultrasonic testing (UT) on a pipe, the UT qualification and procedures can require transducers of an ultrasonic probe do not lift off of the surface by more than a prescribed amount. Lift off can be caused by an irregular pipe surface due to weld distortion, slag, or other manufacturing conditions. A compact distance sensor that can be held by an operator using one hand and that alerts the operator of sub regions within a currently sensed region of the pipe is advantageous for identifying irregular pipe surfaces. Such a compact distance sensor is more effective than other sensing options, such as a contact sensing device including feeler gages. A contact sensing device including feeler gages can provide inaccurate feedback because the feeler gages can be inadvertently forced into gaps. Also, contact sensing device including feeler gages requires two hands for operation, making it difficult to use in tight areas.

Figure 1:
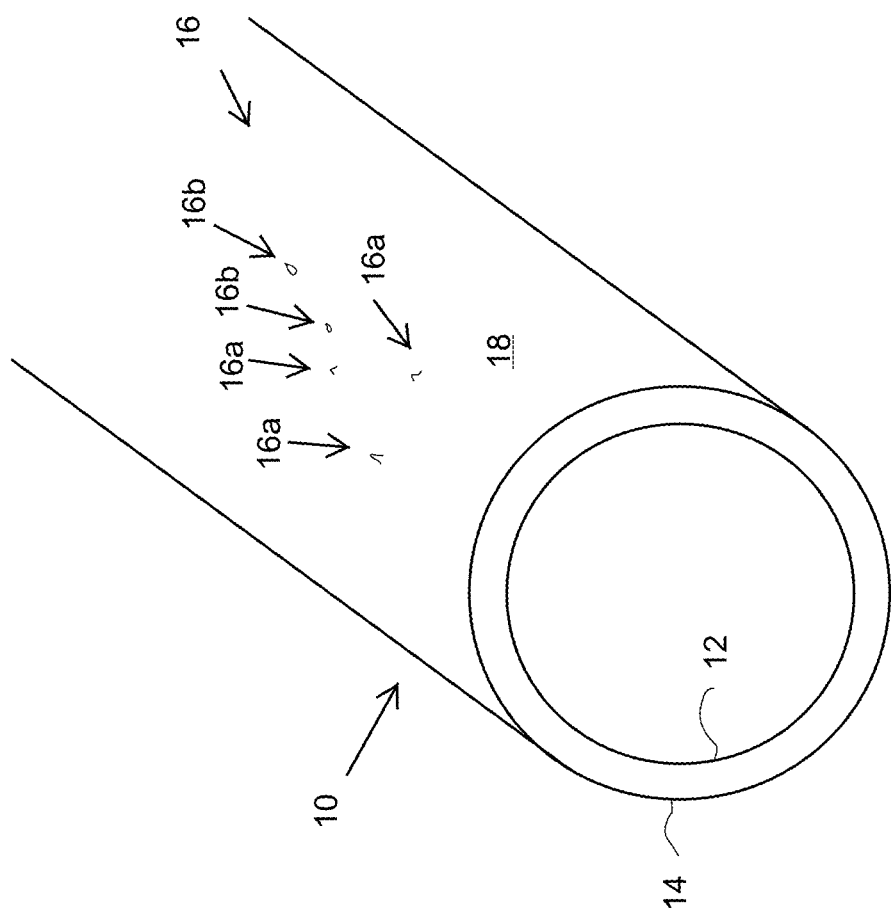
FIG. 1 schematically shows a cross-sectional perspective of a tube for inspection in accordance with an embodiment of the present invention.

FIG. 1 schematically shows a cross-sectional perspective of a tube 10 for inspection in accordance with an embodiment of the present invention. In preferred embodiments, tube 10 is a pipe in a nuclear power plant. Tube 10 includes an inner circumferential surface 12 and an outer circumferential surface 14.

As is further described below, tube 10 is to be subjected to testing in order identify defects or flaws in tube 10 prior to use a nuclear power plant or during a shutdown of a nuclear power plant. In one preferred embodiment, the testing may involve moving a curved surface 102 of an UT probe 100 (schematically shown in FIG. 4) along outer circumferential surface 14 of tube 10. However, outer circumferential surface 14 may include a plurality of surface irregularities 16 deviating from an expected nominal geometry of a nominal curved surface region 18 of outer circumferential surface 14. Surface irregularities 16 include protrusions 16a protruding above nominal curved surface region 18 and depressions 16b extending below nominal curved surface region 18. Surface irregularities 16 may cause curved surface 102 of probe 100 to lift off of surface region 18, generating errors in the measurements of probe 100.

Figure 2:
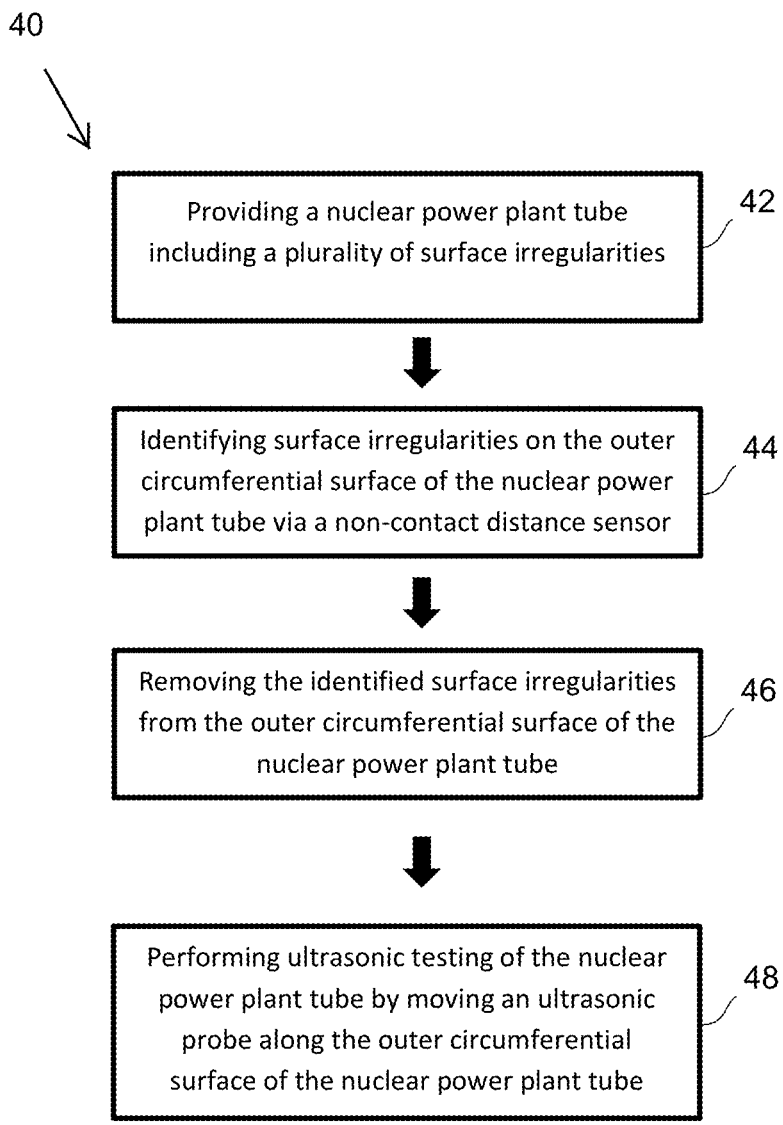
FIG. 2 shows steps of a method in accordance with an embodiment of the present invention.

In order to optimize the accuracy of the measurements by ultrasonic probe 100, a method 40, which is shown in FIG. 2, is performed on tube 10. Method 40 involves a first step 42 of providing a nuclear power plant tube 10 including a plurality of surface irregularities 16. Next, a step 44 is performed of identifying surface irregularities 16 on outer circumferential surface 14 of tube 10 via a distance sensor, which in one preferred embodiment is the handheld distance sensor unit 70 shown in FIGS. 3a, 3b. After step 44, method 40 further includes a step 46 of removing the surface irregularities 16 identified in step 44. After the surface irregularities 16 are removed, the method 40 includes a step 48 of performing ultrasonic testing of the nuclear power plant tube by moving an ultrasonic probe, which may be the UT probe 100 shown in FIG. 5, along the outer circumferential surface of the nuclear power plant tube 10

Figure 3A:
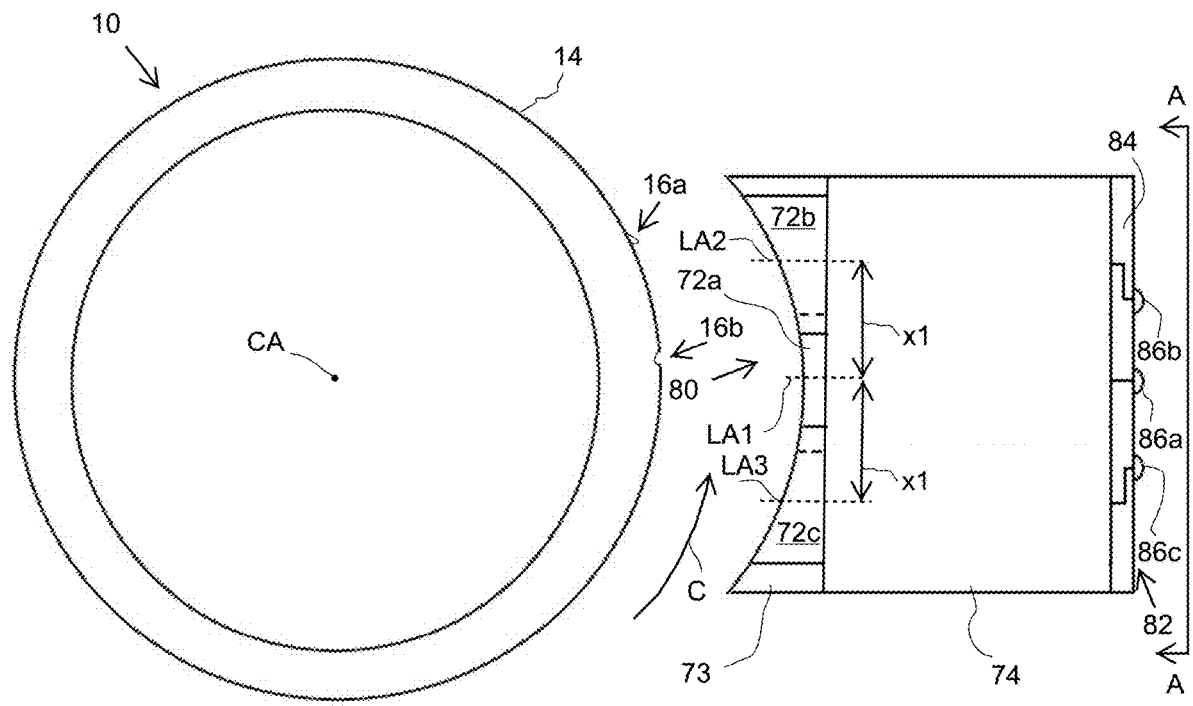
FIGS. 3a to 3c show different views of a handheld distance sensor unit in accordance with an embodiment of the present invention measuring surface irregularities on the tube.
Figure 3B:
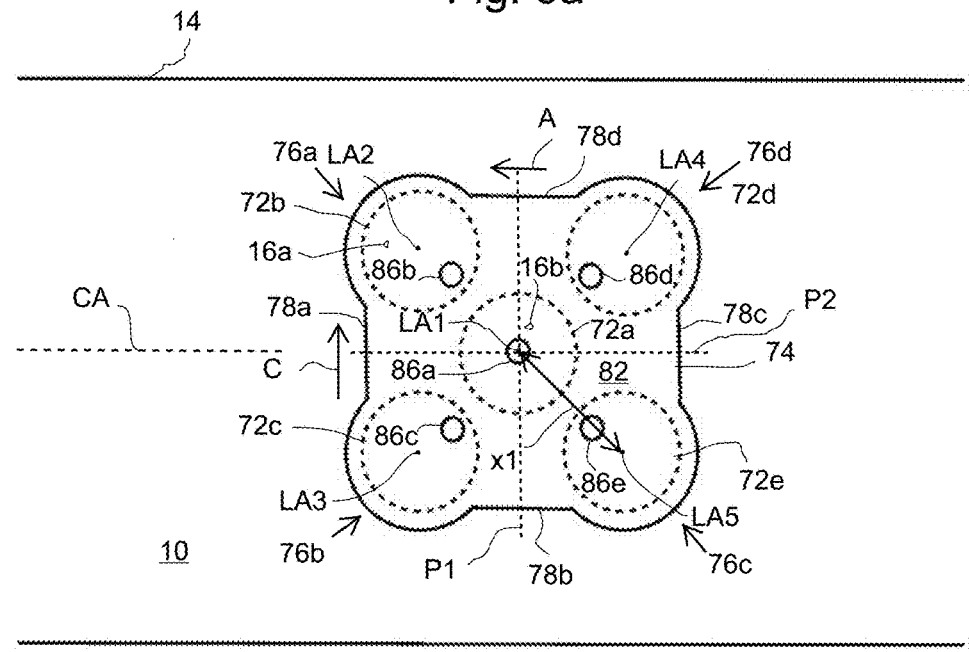
Figure 3C:
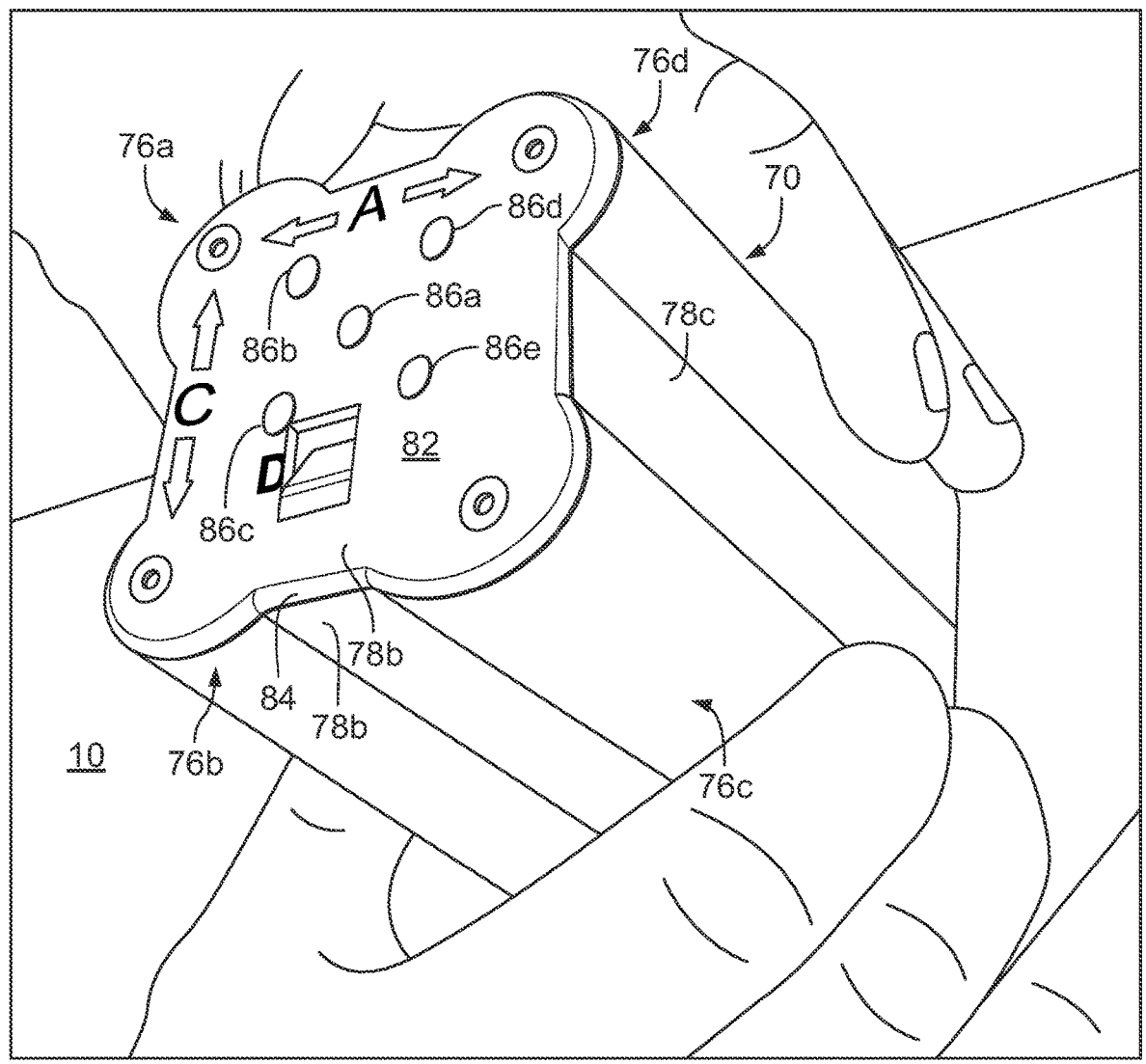

FIGS. 3a to 3c show different views of handheld distance sensor unit 70 in accordance with an embodiment of the present invention measuring surface irregularities 16 on tube 10. FIG. 3a shows a cross-sectional side view measuring for surface irregularities 16—i.e., one protrusion 16a and one depression 16b. FIG. 3b shows a plan view of distance sensor unit 70 along A-A in FIG. 3a. FIG. 3c shows a perspective view of the distance sensor unit 70 being held by a hand of an operator.

Figure 5A:
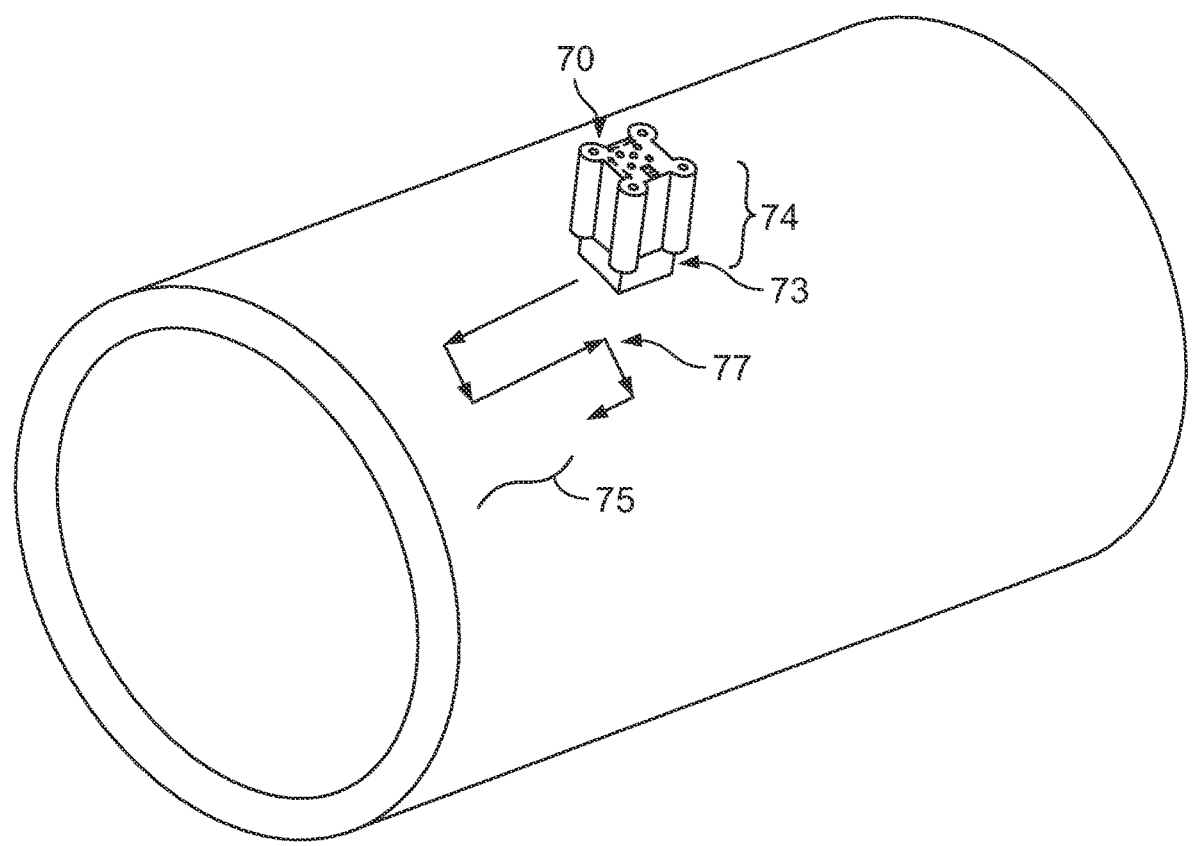
FIG. 5a schematically shows a view of the sensor unit scanning a surface region of a tube.

Distance sensor unit 70 includes a plurality of distance sensors arranged as a sensor array 72 in a block 73 fixed to an end of a housing 74. Block 73 may be formed as separate piece from housing 74 or may be formed integrally with housing 74 as a single piece. More specifically, in the embodiment shown in FIGS. 3a to 3c, sensor array 72 includes five sensors 72a to 72e that are rigidly fixed to block 73, which is rigidly fixed to housing 74. In other embodiments, sensory array 72 may include more or less than five sensors. In one preferred embodiment, sensors 72a to 72e are non-contact sensors, such as proximity sensors. In other embodiments, sensors 72a to 72e may be contact sensors such as linear variable differential transformers Sensors 72a to 72e are configured to identify surface irregularities 16 deviating from an expected nominal geometry of region 18 as the distance sensor unit 70 is moved along the surface 14. In one embodiment, as shown in FIG. 5a, the scanning of an identified surface region 75 involves moving the sensor unit 70 along a path 77 including alternating axial and circumferential movements to ensure the entirety of region 75 is inspected.

Sensors 72a to 72e are in a geometrical arrangement outlining an X-pattern. More specifically, sensors 72a to 72e are aligned in the same manner as the dots representing the number five on a die. Accordingly, first sensor 72a is arranged in a center of block 73, with a longitudinal axis LA1 of first sensor 72a defining a center axis of sensor unit 70 and a center axis of sensor array 72. Housing 74 is configured for being gripped by an operator via a single hand so that unit 70 can be used in tight areas of a nuclear power plant. Second sensor 72b, third sensor 72c, fourth sensor 72d and fifth sensor 72e each include a respective longitudinal axis LA2, LA3, LA4, LA5 that is offset from first sensor 72a by a same distance x1 in a radial direction with respect to the center axis of sensor array 72, providing sensor array 72 with a symmetrical shape.

Sensors 72b, 72c, 72d, 72e are positioned in the corners 76a, 76b, 76c, 76d of sensor unit 70 and define the periphery of sensor array 72. In the embodiment shown in FIGS. 3a to 3c, corners 76a, 76b, 76c, 76d have a rounded shape. More specifically, as shown in FIG. 3c, corners 76a, 76b, 76c, 76d have semi-cylindrical shape. Sensor unit 70 further includes sidewalls 78a, 78b, 78c, 78d extending between corners 76a, 76b, 76c, 76d. A first sidewall 78a extends between sensors 72b, 72c from corner 76a to corner 76b, a second sidewall 78b extends between sensors 72c, 72d from corner 76b to corner 76c, a third sidewall 78c extends between sensors 72c, 72d from corner 76b to corner 76c and a fourth sidewall 78d extends between sensors 72e, 72a from corner 76d to corner 76a.

Distance sensor unit 70 includes a concave inner surface 80 formed on block 73 and configured for facing outer circumferential surface 14 of tube 10 during the sensing of surface irregularities on outer circumferential surface 14. Opposite of inner surface 80, sensor unit 70 includes an outer surface 82 configured for facing away from the outer circumferential surface 14 of tube 10 during the sensing of surface irregularities on outer circumferential surface 14. Outer surface 82 is formed by a plate 84 of housing 74. Plate 84 is fixed to outer edges of corners 76a to 76d and side walls 78a to 78d.

Unit 70 also includes at least one alert indicator configured for providing notification to the operator as the distance sensor unit 70 moves over one of the surface irregularities 16 deviating from the expected nominal geometry of the surface 14. In some embodiments, the surface irregularity indicator is configured for providing the alert to the operator as the distance sensor unit moves over one of the surface irregularities deviating from the expected nominal geometry of the surface beyond a predetermined distance threshold. In other embodiments, the alert indicator is configured for providing the alert to the operator in the form of a displayed quantitative value of a deviation from the expected nominal geometry.

In the embodiment shown in FIGS. 3a to 3c, distance sensor unit 70 includes at least one surface irregularity indicator in the form of lights 86a to 86e. Each of lights 86a to 86e is electrically connected to a respective one of sensors 72a to 72e to provide an alert, in the form of a visual indication, that the respective sensors 72a to 72e has sensed a surface irregularity 16 that protrudes from surface region 18 by the predetermined threshold. In one preferred embodiment, sensors 72a to 72e are inductive proximity sensors that have a triggering distance that corresponds to the predetermined threshold of the amount of surface irregularities to be detected. These sensors 72a to 72e are mounted flush with the surface 80 of the contoured block 73. When distance sensor unit 70 is powered on, each of lights 86a to 86e is illuminated in a first color such as a green and as one or more of sensors 72a to 72 detects a surface irregularity, the corresponding light or lights 86a to 86e is illuminated in a second color such as red. In other embodiments, lights may only be illuminated when detecting a surface irregularity, and are otherwise not illuminated. In still further embodiments, the alert may be a visual indication and the at least one surface irregularity indicator may be a display screen. In still further embodiments, the alert may be an audio alert and the at least one surface irregularity indicator may be a speaker. In still further embodiments, the alert may be tactile such as a vibration.

Lights 86a to 86e are mounted on housing 74 at plate 84 to generate alerts to the operator at surface 82 in the form of visual indications. To effectively alert the operator to the specific portion of surface in front of unit 70 having the surface irregularity, lights 86a to 86e are provided in the same geometric arrangement as sensors 72a to 72e. More specifically, lights 86a to 86b are in a geometrical arrangement outlining an X-pattern, with lights 86a to 86e being aligned in the same manner as the dots representing the number five on a die. Providing lights 86a to 86e in the same geometrical arrangement as sensors 72a to 72e allows an operator to more specifically identify the area of outer circumferential surface 14 that includes the detected irregularity. As soon as an irregularity is detected by one of sensors 72a to 72e, the respective light 86a to 86e is illuminated in a manner indicating the presence of the surface irregularity. This allows the operator of distance sensor unit 70 to be immediately informed of which specific section of the area of circumferential surface 14 in front of surface 80 includes the detected surface irregularity. In one preferred embodiment, the operator can mark the identified surface irregularity upon indication by sensor unit 70, so the operator knows the region including the identified surface irregularity is to be machined before ultrasonic testing.

To sense surface irregularities on outer circumferential surface 14, distance sensor unit 70 is configured for being held in the hand of an operator and moved in a circumferential direction C and an axial direction A with respect to a center axis CA of tube 10.

Sensor array 72 is configured such that sensor array 72 has a symmetrical arrangement with respect to both the circumferential direction C and the axial direction A. More specifically, by sensor array 72 having a symmetrical arrangement with respect to the circumferential direction C, it is meant that a sensor array 72 is symmetrical about a plane P1 passing through longitudinal axis LA1 and sidewalls 78d, 78b and by sensor array 72 having a symmetrical arrangement with respect to the axial direction A, it is meant that sensor array 72 is symmetrical about a plane P2 passing through longitudinal axis LA2 and sidewalls 78a, 78c. Such an arrangement, along with the central placement of sensor 72a in the middle of sensors 72b to 72e and the axial and circumferential continuity of sensor 72a with sensors 72b to 72e (i.e., the overlap of sensor 72a with respect to sensors 72b to 72e in the circumferential and axial direction), allows sensor array 72 to sense any surface irregularities 16 that are in front of surface 80 during both movement of sensor unit 70 along outer circumferential surface 14 in both the circumferential direction C and the axial direction A, such that there are no blind spots within array 72 that could cause an irregularity to be missed.

As shown in FIGS. 3a and 3b, there is a protrusion 16a in the sensing region of sensor 72b and a depression 16b in the sensing region of sensor 72a, but there are no surface irregularities in the sensing region of sensors 72c to 72e. Accordingly, in the embodiment where green and red illuminations are used with respect to lights 86a to 86e, assuming that protrusion 16a protrudes radially from surface region 18 (FIG. 1) by the predetermined distance threshold and depression 16b extends below nominal curved surface region 18 by the predetermined distance threshold, light 86b is illuminated in red to indicate the presence of protrusion 16a in the sensing region of sensor 72b and light 86a is illuminated in red to indicate the presence of depression 16b in the sensing region of sensor 72a, while lights 86c to 86e are illuminated in green to indicate the absence of surface irregularities in the sensing regions of sensors 72c to 72e deviating from surface region 18 by the predetermined distance threshold.

Figure 5B:
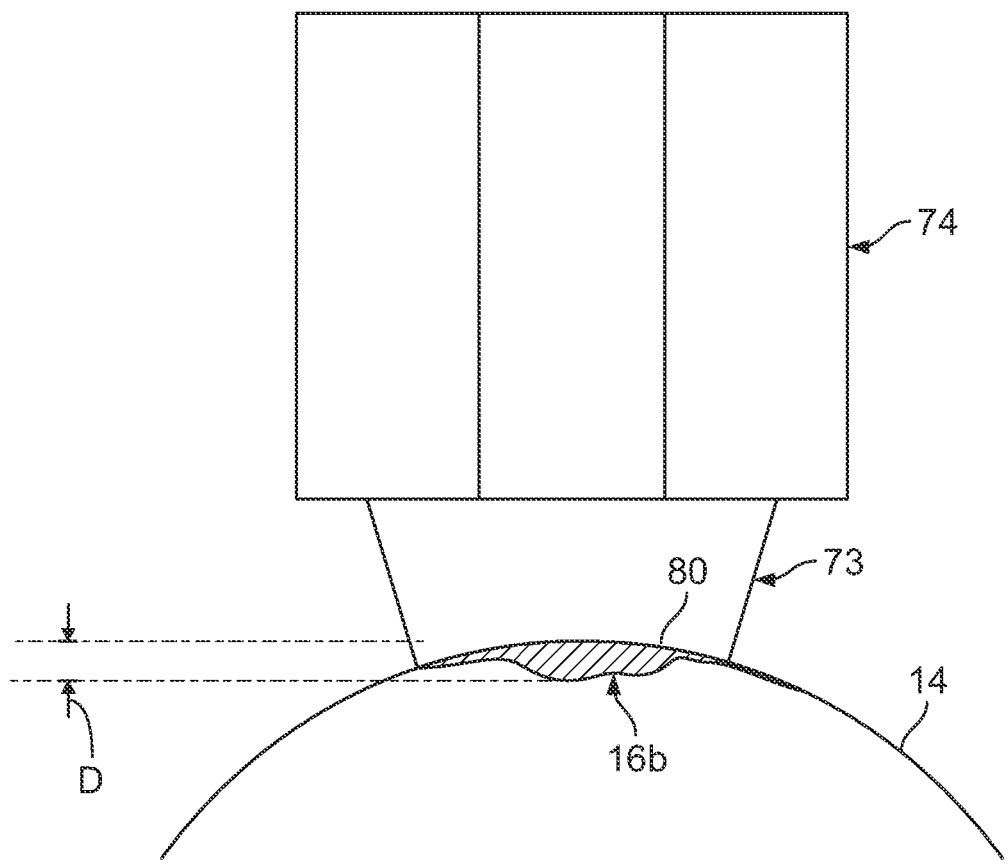
FIG. 5b schematically shows a view of the sensor unit passing over a depression.

As shown in FIG. 5b, if unit 70 is moved across a depression 16b in the surface, the maximum depth D of the depression 16b is either directly measured to output a quantitative value of the depression or, signaled via an alert if the maximum depth D of the depression is greater than the pre-determined threshold. For depressions 16b, the surface 80 of contoured block 73 remains substantially flush with the surface 14 being scanned.

Figure 5C:
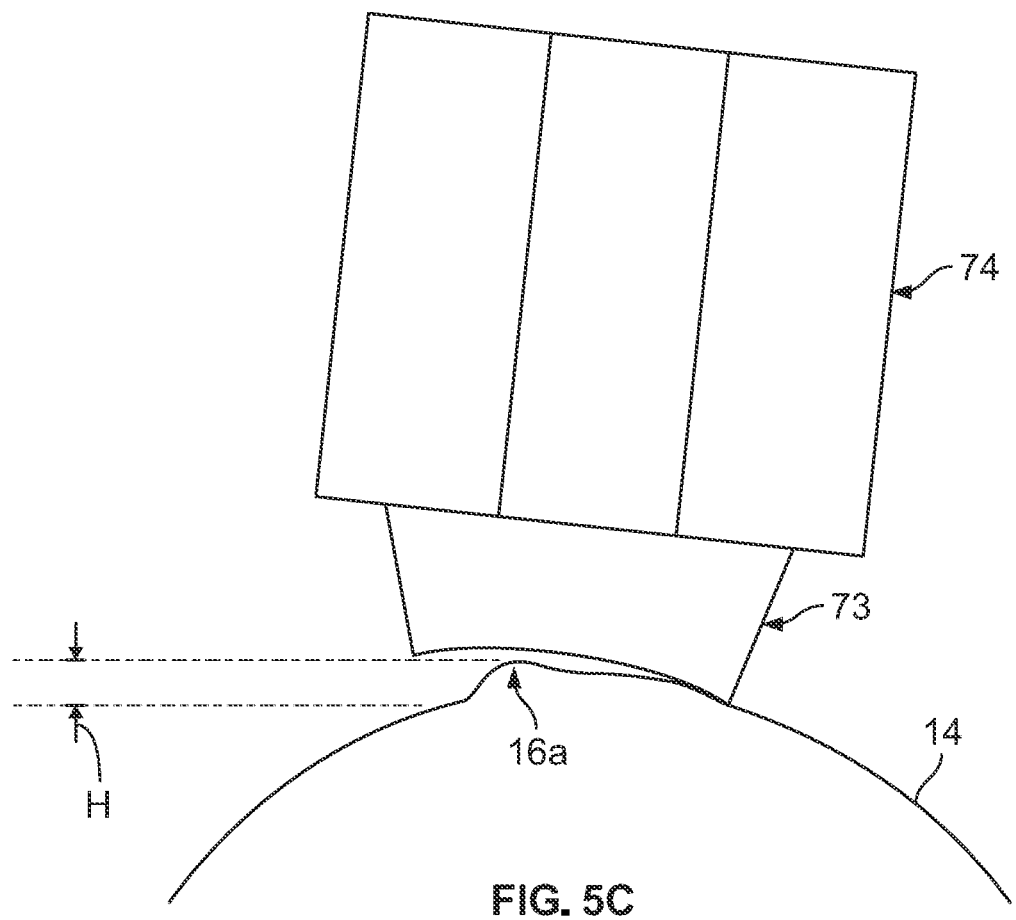
FIG. 5c schematically shows a view of the sensor unit passing over a protrusion.

As shown in FIG. 5c, if unit 70 is moved across a protrusion 16a on the surface, the surface 80 of contoured block 73 is displaced away from the nominal surface 18 as the block 73 passes across the protrusion 16a. The displacement caused by the protrusion 16a increases a distance H between surface region 18 and the respective sensor by a value corresponding to a maximum radial height of the protrusion 16a. The distance H is either directly measured to output a quantitative value of the maximum radial height of the protrusion 16a for display to the operator via a graphical user interface or, signaled via an alert if the maximum radial height of the protrusion 16a is greater than the pre-determined threshold.

As noted above, after surface irregularities above the predetermined distance threshold are identified and marked for removal, the protrusions 16a are removed via machining in step 46, for example by a grinder.

Figure 4:
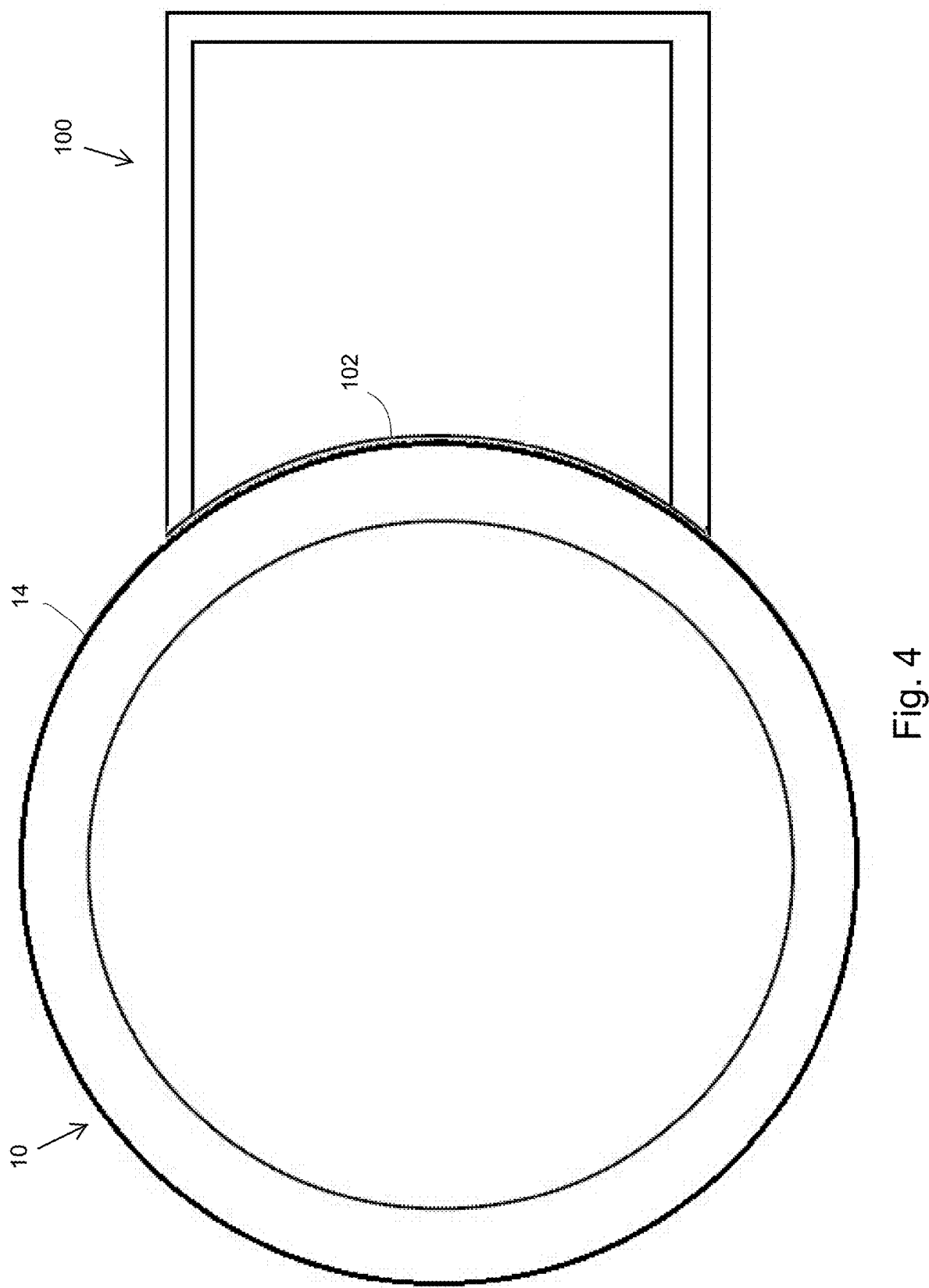
FIG. 4 schematically shows a view of an ultrasonic probe for use in the method shown in FIG. 2.

As noted above, after surface irregularities above the predetermined distance threshold are removed via a grinder, tube 10 is non-destructively examined via UT probe 100 shown in FIG. 4 by moving the transducers 102 along outer circumferential surface 14 of tube 10. Because surface irregularities above the predetermined distance threshold have been removed, liftoff of transducers 102 from outer circumferential surface 14 is minimized to a degree that is within the qualified parameters for the UT process.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A distance sensor unit comprising:
    an array of distance sensors configured to identify surface irregularities deviating from an expected nominal geometry of a surface as the distance sensor unit is moved along the surface by measuring a distance between each of the distance sensors and the surface;
    a handheld housing configured for being gripped by an operator, the array of distance sensors being connected to the handheld housing; and
    at least one surface irregularity indicator configured for providing an alert to the operator as the distance sensor unit moves over one of the surface irregularities deviating from the expected nominal geometry of the surface,
    wherein the at least one surface irregularity indicator is configured for providing the alert to the operator as the distance sensor unit moves over one of the surface irregularities deviating from the expected nominal geometry of the surface beyond a predetermined distance threshold,
    wherein the at least one surface irregularity indicator is a plurality of lights, each of the lights corresponding to one of the distance sensors, each of the lights being illuminated in a predefined manner when the corresponding distance sensor senses one of the surface irregularities deviating from the expected nominal geometry of the surface above the predetermined threshold.

2. The distance sensor unit as recited in claim 1 wherein the at least one surface irregularity indicator is configured for providing the alert to the operator in the form of a displayed quantitative value of a deviation from the expected nominal geometry.

3. The distance sensor unit as recited in claim 1 wherein the at least one surface irregularity indicator is configured such that the alert informs the operator which of the distance sensors sensed the surface irregularities deviating from the expected nominal geometry of the surface.

4. The distance sensor unit as recited in claim 1 wherein the alert is a visual indication generated on the housing of the distance sensor unit.

5. The distance sensor unit as recited in claim 1 wherein the distance sensors are non-contact distance sensors.

6. The distance sensor unit as recited in claim 1 further comprising a block fixed to the housing, the distance sensors being mounted in the block, the block having a contact surface contoured to match the expected nominal geometry of the surface.

7. The distance sensor unit as recited in claim 6 wherein the contact surface of the block is configured to contact the surface during the measurement such that surface irregularities protruding above the expected nominal geometry of the surface cause the block to lift off the surface.

8. A distance sensor unit comprising:
an array of distance sensors configured to identify surface irregularities deviating from an expected nominal geometry of a surface as the distance sensor unit is moved along the surface by measuring a distance between each of the distance sensors and the surface;
a handheld housing configured for being gripped by an operator, the array of distance sensors being connected to the handheld housing; and
at least one surface irregularity indicator configured for providing an alert to the operator as the distance sensor unit moves over one of the surface irregularities deviating from the expected nominal geometry of the surface,
wherein the at least one surface irregularity indicator includes a plurality of surface irregularity indicators, the surface irregularity indicators being in a geometric arrangement corresponding to a geometric arrangement of the distance sensors.

9. The method as recited in claim 8 wherein the alert is a visual indication generated on the housing of the distance sensor unit in the geometric arrangement of the surface irregularity indicators.

10. A method for inspecting a surface of a part, the method comprising:
moving a distance sensor unit including an array of distance sensors along the surface to identify surface irregularities radially protruding beyond a predetermined distance threshold as the distance sensor unit is moved along the surface by measuring a distance between each of the distance sensors and the surface;
removing the surface irregularities radially protruding beyond the predetermined distance threshold; and
inspecting the part by moving a testing probe along the surface after the removing of the surface irregularities radially protruding beyond the predetermined distance threshold;
wherein the part is a nuclear power plant pipe and the surface is an outer circumferential surface of the nuclear power plant pipe.

11. The method as reciting in claim 10 wherein the distance sensor unit indicates a presence of surface irregularities radially protruding beyond the predetermined distance threshold by providing an alert as the distance sensor unit moves over one of the surface irregularities radially protruding beyond the predetermined distance threshold.

12. The method as recited in claim 11 wherein the alert informs the operator which of the distance sensors sensed the surface irregularity.

13. The method as recited in claim 12 wherein the alert is a visual indication generated on a housing of the distance sensor unit.

14. The method as recited in claim 12 wherein the distance sensor unit includes a plurality of lights, each of the lights corresponding to one of the distance sensors, each of the lights being illuminated in a predefined manner when the corresponding distance sensor senses a surface irregularity above the predetermined threshold.

15. The method as recited in claim 14 wherein the lights are in a geometric arrangement corresponding to a geometric arrangement of the distance sensors.

16. The method as recited in claim 10 wherein the testing probe includes ultrasonic transducers contacting the surface during the ultrasonic inspecting of the surface.

* * * * *